(12) United States Patent
Hirayama

(10) Patent No.: US 7,823,823 B2
(45) Date of Patent: Nov. 2, 2010

(54) DRAG ADJUSTING DEVICE FOR DUAL-BEARING REEL

(75) Inventor: Hirokazu Hirayama, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 12/582,710

(22) Filed: Oct. 21, 2009

(65) Prior Publication Data

US 2010/0123035 A1    May 20, 2010

(30) Foreign Application Priority Data

Nov. 20, 2008    (JP) ............................... 2008-296456

(51) Int. Cl.
*A01K 89/01* (2006.01)
(52) U.S. Cl. ..................... 242/245; 242/266; 242/303; 242/304
(58) Field of Classification Search ................. 242/245, 242/265, 266, 291, 302, 303, 304
See application file for complete search history.

(56) References Cited

U.S. PATENT DOCUMENTS

| | | | | |
|---|---|---|---|---|
| 3,425,644 A | * | 2/1969 | Griste | ........................ 242/270 |
| 3,478,979 A | * | 11/1969 | Henze | ........................ 242/270 |
| 4,516,741 A | * | 5/1985 | Hashimoto | ................... 242/270 |
| 5,348,247 A | | 9/1994 | Kaneko | |
| 6,648,256 B1 | | 11/2003 | Baisch | |
| 7,234,661 B2 | * | 6/2007 | Hirayama et al. | ........... 242/303 |
| 7,661,618 B2 | * | 2/2010 | Takechi | ....................... 242/303 |

FOREIGN PATENT DOCUMENTS

JP    H05-51080 U    7/1993

OTHER PUBLICATIONS

The extended European Search Report in corresponding European Application No. 09172815.4 dated Jun. 21, 2010.

* cited by examiner

*Primary Examiner*—Emmanuel M Marcelo
(74) *Attorney, Agent, or Firm*—Shinjyu Global IP

(57) ABSTRACT

A drag adjusting device for a dual-bearing reel, including a reel unit with a drag operating member configured to pivot within a range between a minimum position and a maximum position. A plate member is attached to an outer side of the reel unit. A drag restricting member is detachably coupled to the outer side surface of the plate member and between the minimum and the maximum pivot position of the drag operating member. The drag restricting member is detachably coupled to the plate member so as to contact and restrict pivotal movement of the drag operating member.

9 Claims, 12 Drawing Sheets

DRAG ADJUSTING DEVICE FOR DUAL-BEARING REEL

CROSS-REFERENCE TO RELATED APPLICATIONS

This application claims priority under 35 U.S.C. §119 to Japanese Patent Application No. 2008-296456 filed on Nov. 20, 2008. The entire disclosure of Japanese Patent Application No. 2008-296456 is hereby incorporated herein by reference.

BACKGROUND OF THE INVENTION

1. Field of the Invention

The present invention relates to a drag adjusting device, particularly a drag adjusting device for a dual-bearing reel contrived to adjust a drag force of a drag mechanism serving to brake a spool that is rotatably mounted to a reel unit of the dual-bearing reel.

2. Background Information

A known type of lever drag reel is contrived such that a drag force can be adjusted by using a drag operating member to move a spool shaft in an axial direction, the drag operating member being mounted such that it can pivot about a spool shaft of the spool. Japanese Laid-open Utility Model Publication No. 05-51080 discloses a lever drag reel of this type which is contrived such that a maximum pivot position of the drag operating member can be restricted. More specifically, an arc-shaped restricting member having an engaging portion provided on an outside edge portion thereof is rotated along an elongated hole and fixed in a prescribed position with respect to a side plate of a reel unit, thereby enabling a drag operating member to be pivoted within a portion established by the position of the engaging portion of the arc-shaped restricting member. The arc-shaped restricting member is contrived such that a rotational position thereof about a spool shaft can be adjusted by moving it along a circular arc-shaped elongated hole and such that it can be fixed in place with a set screw. Thus, the maximum pivot position of the drag operating member can be varied by an amount corresponding to the length of the elongated hole.

SUMMARY OF THE INVENTION

In the conventional lever drag reel described above, the arc-shaped restricting member is contrived such that a rotational position thereof about a spool shaft can be adjusted by moving it along a circular arc-shaped elongated hole and such that it can be fixed in place with a set screw. Thus, the maximum pivot position of the drag operating member can be varied by an amount corresponding to the length of the elongated hole. However, when an angler discovers an optimum maximum pivot position of the drag operating member while in the midst of fishing, it is extremely difficult to accomplish the task of changing the maximum pivot position of the drag operating member because doing so requires removing and then reinstalling the set screw. Additionally, since the maximum pivot position of the drag operating member can only be changed by an amount corresponding to the length of the elongated hole, a minimum pivot position of the drag operating member cannot be set and it is difficult to set the maximum pivot position in fine increments. Consequently, it is difficult for an angler to obtain a desired pivot position of the drag operating member. In particular, when a minimum pivot position of the drag operating member cannot be set, there is the possibility that an angler will inadvertently move the drag operating member too far when returning the drag operating member to a lower drag state, thereby causing the drag force to weaken and the fishing line to backlash. Conversely, if the maximum pivot position of the drag operating member cannot be set appropriately, then the drag operating member might be accidentally moved to a position where the drag force is too large and the fishing line could break.

In view of the above, it will be apparent to those skilled in the art from this disclosure that there exists a need for an improved drag adjusting device. This invention addresses this need in the art as well as other needs, which will become apparent to those skilled in the art from this disclosure.

Accordingly, aspects of the present invention have been created to solve the above-mentioned problems occurring in the conventional practice, and to provide a drag adjusting device for a dual-bearing reel that enables an angler to easily change a pivot range of the drag operating member as desired.

According to one aspect of the present invention, a drag adjusting device is provided for a dual-bearing reel for adjusting a drag force of a drag mechanism and constructed to brake a spool rotatably mounted to a reel unit of the dual-bearing reel. The drag adjusting device comprises a drag operating member that is pivotally attached to an outer side of the reel unit so as to pivot about a spool shaft of the spool between a minimum position corresponding to a minimum drag state of the drag mechanism and a maximum position corresponding to a maximum drag state of the drag mechanism, and a drag restricting member that is detachably coupled to the outer side of the reel unit and disposed within the pivot range between the minimum position and the maximum position. The drag restricting member is adapted to contact the drag operating member so as to restrict pivotal movement of the drag operating member.

According to another aspect of the present invention, a drag adjusting device is provided for a dual-bearing reel, wherein the reel unit including a side cover, a substantially circular shaped plate member that is attached to the outer side of the side cover, and a plurality of mounting recesses that is arranged along the outer peripheral surface of the plate member between the minimum position and the maximum position. The drag restricting member is configured to be mounted in any one of the plurality of mounting recesses.

According to yet another aspect of the present invention, a drag adjusting device is provided for a dual-bearing reel, wherein each of the plurality of mounting recesses is a through-hole.

According to another aspect of the present invention, a drag adjusting device is provided for a dual-bearing reel, further comprising a sound generating member is mounted to the drag operating member, and being reciprocally movable toward and away from the plurality of mounting recesses to generate a sound by repeatedly contacting the plurality of mounting recesses.

According to still a further aspect of the present invention, a drag adjusting device is provided for a dual-bearing reel, wherein the drag restricting member has a substantially cylindrical shape. Formed on a side of the drag restricting member is an aperture to that can be removably mounted to the drag restricting member onto an outer edge portion of the substantially circular plate member.

According to another aspect of the present invention, a drag adjusting device is provided for a dual-bearing reel, wherein a force applying member is disposed inside the cylindrical portion, and a pin member including a shaft member is inserted through the force applying member and a channel of the cylindrical portion. The pin member is urged into one of the plurality of mounting recesses by the force applying member.

According to yet another aspect of the present invention, a drag adjusting device is provided for a dual-bearing reel, wherein the pin member has a detachment preventing portion provided on one end portion of the shaft member and adapted to be inserted into one of the plurality of mounting recesses. The pin member also has a knob portion removably coupled to an opposing end portion of the shaft member. The knob portion is in contact with the cylindrical portion of the drag restricting member and having a diameter larger than the shaft member.

According to still another aspect of the present invention, a drag adjusting device is provided for a dual-bearing reel, wherein the cylindrical portion of the drag restricting member and the channel of the cylindrical portion are non-concentrically disposed along the longitudinal direction.

According to another aspect of the present invention, a drag adjusting device is provided for a dual-bearing reel, wherein a first braking member attached to an outer side of the spool, and a second braking member configured to contact the first braking member, the second braking member being connected to the spool shaft to prevent movement in the axial direction and rotational movement in a line reel-out direction of the spool. A variable braking force is applied to the spool when the drag operating member pivots between the minimum position and the maximum position.

These and other features, aspects and advantages of the present invention will become apparent to those skilled in the art from the following detailed description, which, taken in conjunction with the annexed drawings, discloses a preferred and other example embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
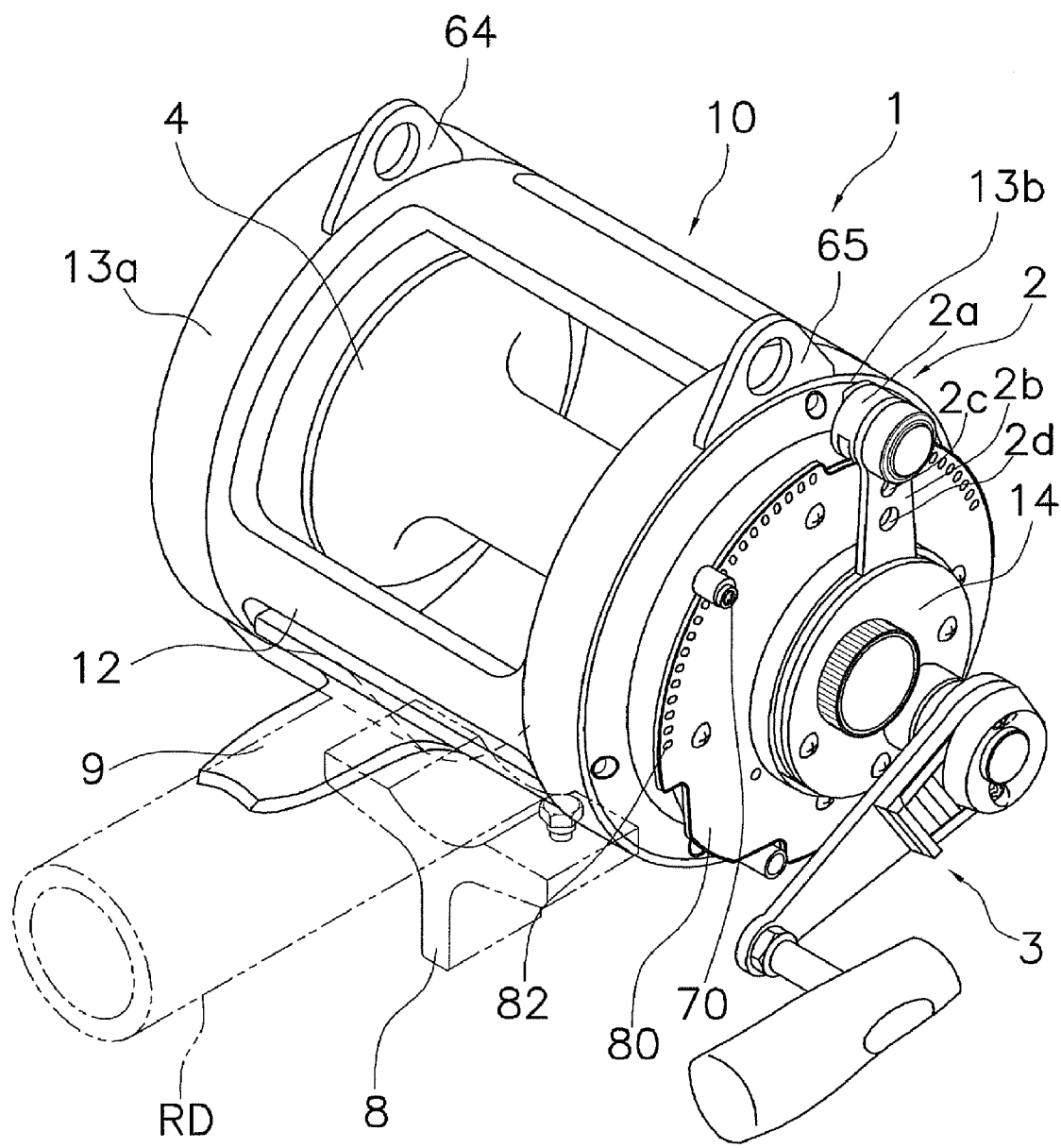
FIG. 1 is a perspective view of dual-bearing reel in accordance with an embodiment of the present invention.
Figure 2:
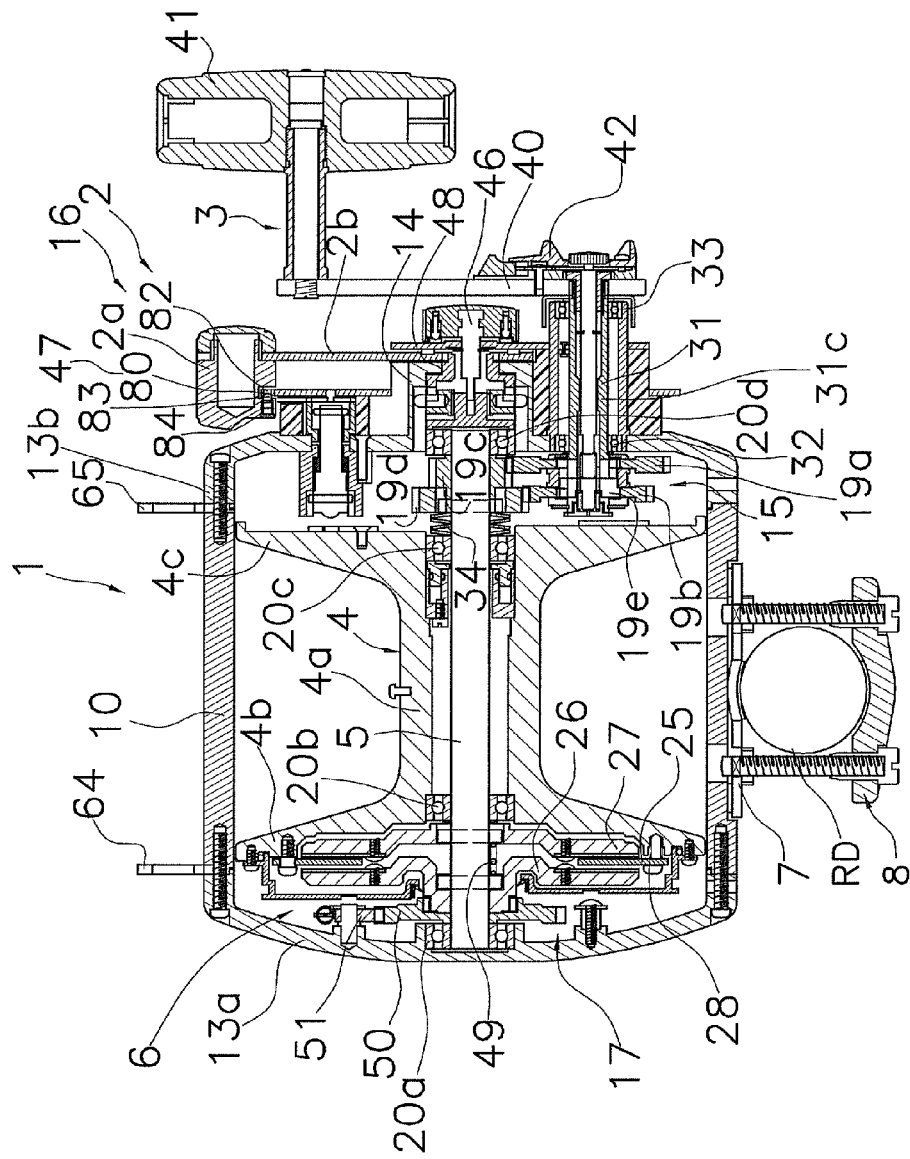
FIG. 2 is a cross sectional view of the same dual-bearing reel.

Referring initially to FIGS. 1 and 2, a lever drag type dual-bearing reel for trolling is shown in accordance with an embodiment of the present invention. The dual-bearing reel has a cylindrical reel unit 1, a spool shaft 5 rotatably mounted in a center portion of the reel unit 1, a spool 4 supported on the spool shaft 5 such that it can rotate freely but cannot move in an axial direction, and a handle 3 arranged on a side of the reel unit 1. The dual-bearing reel also has the following components all arranged inside the reel unit 1: a rotation transmission mechanism 15 contrived to transmit rotation of the handle 3 to the spool 4, a drag mechanism 6 contrived to brake rotation of the spool 4 in a line reel-out direction, a drag adjusting mechanism 16 contrived to adjust a drag force of the drag mechanism 6, and a reverse rotation preventing mechanism 17 contrived to restrict rotation of the spool in the line reel-out direction.

The reel unit 1 has a left-hand first side cover 13a and a right-hand second side cover 13b—each of which is dish-shaped and made of metal—and a frame 10 arranged and configured such that both ends thereof are covered by the first side cover 13a and the second side cover 13b. The frame 10 is a metal cylindrical member with holes formed therein and is fixed in place with a plurality of screws. The first side cover 13a and the second side cover 13b are connected concentrically onto both ends of the frame 10 with faucet joints.

Figure 3:
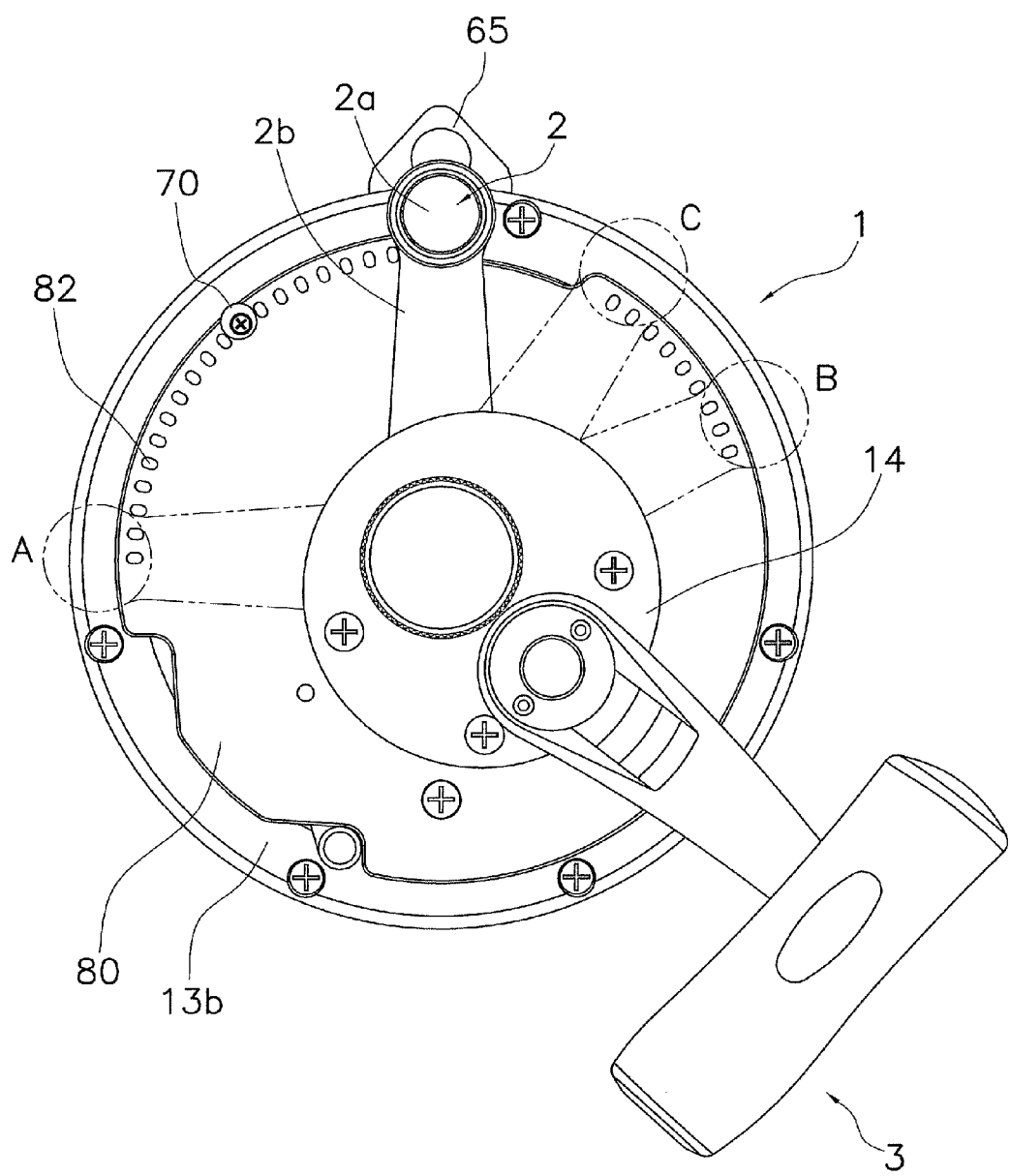
FIG. 3 is a side view of the same dual-bearing reel.
Figure 4:
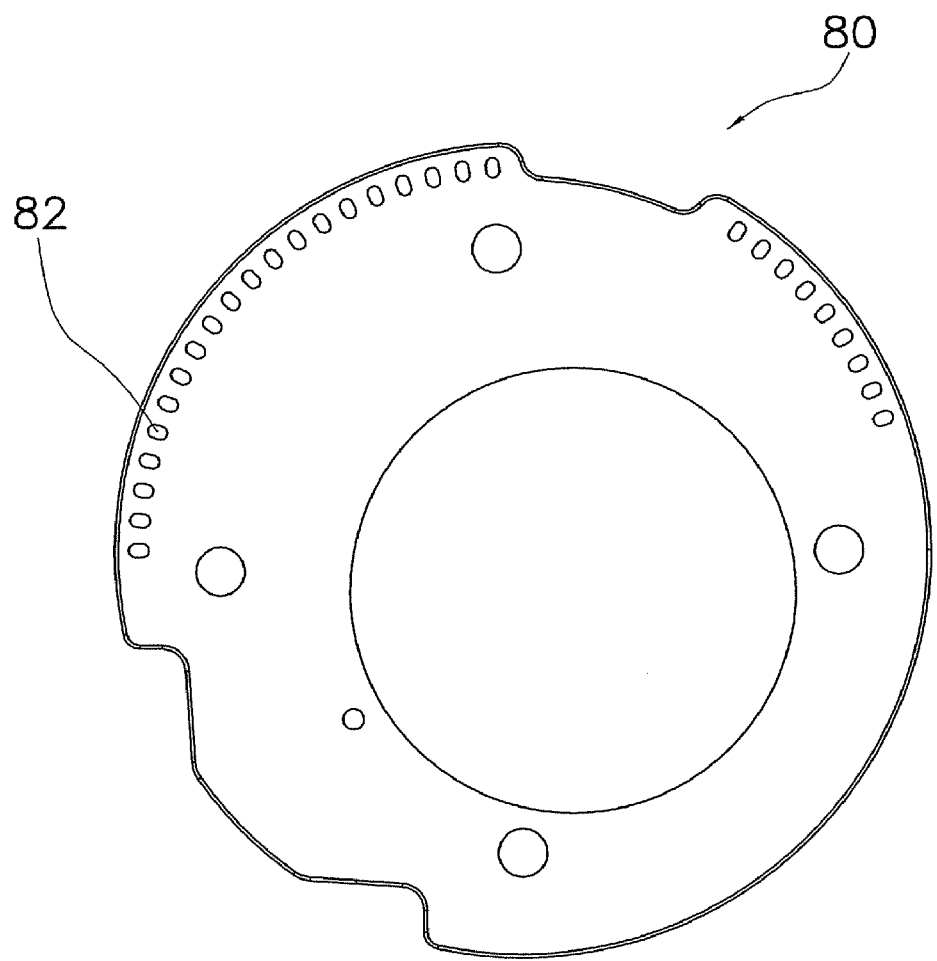
FIG. 4 is an enlarged side view of a plate member.

As shown in FIGS. 1, 3, and 4, a circular disk-shaped plate member 80 is screw fastened to an outward side of the second side cover 13b. The plate member 80 is made of an aluminum alloy. A through hole configured to allow a cylindrical portion 14 to pass through is formed in a middle portion of the plate member 80, and a cut-away portion is provided in an upper portion of the plate member 80. Through holes 82 are provided in an outward portion of a side portion of the plate member 80 and arranged side by side along a pivot direction within the pivot range of a drag operating member 2. The through holes 82 form part of a drag adjustment sound generating mechanism 47 (described later) contrived to generate a sound in response to a pivot movement of the drag operating member 2. An outer circumferential portion of the plate member 80 fits into a semicircular cut-out portion formed in a bottom surface of an operating part 2a (described later) of the drag operating member 2 and functions as a lever guide for supporting the drag operating member 2 in the pivot direction. Each of the through holes 82 has a circular peripheral shape and serves as a sound generating recess for generating a sound in response to a pivot movement of the drag operating member 2.

Additionally, as shown in FIGS. 1, 3, and 4, the through holes 82 function as mounting recesses for detachably mounting a drag restricting member 70 (described later). The through holes 82 are provided in an outward portion of a side portion of the plate member 80 and arranged side by side along a pivot direction of the drag operating member 2 within a pivot range of the drag operating member 2. The drag restricting member 70 is configured to be detachably mounted in any one of the through holes 82.

The first side cover 13a and the second side cover 13b are arranged to rotatably support both ends of the spool shaft 5 with approximately center portions thereof. As shown in FIGS. 2 and 3, a cylindrical portion 14 arranged to protrude outward along an axial direction is provided on the second side cover 13b (which is the side cover located on the handle 3 side of the reel) to support the spool shaft 5.

As shown in FIGS. 1 and 2, two harness lugs 64 and 65 for attaching to a reel harness are provided on an upper portion between the frame 10 and the first and second side covers 13a and 13b and arranged to be spaced apart from each other. A rod mounting leg 7 for mounting the reel to a fishing rod RD is provided on a lower portion of the frame 10. A rod clamp 8 is arranged opposite the rod mounting leg 7 such that the fishing rod RD is sandwiched in-between.

As shown in FIG. 2, the spool shaft 5 is rotatably supported in the first and second side covers 13a and 13b of the reel unit 1 with a left-right pair of bearings 20a and 20d arranged at both ends of the spool shaft 5. Meanwhile, the spool 4 is rotatably supported on two bearings 20b and 20c that are spaced apart from each other along an axial direction and arranged at both ends of the spool 4 between the bearings 20a and 20d. A component part of a moving mechanism 46 of the drag mechanism 6 is arranged to abut against a right side of an outer race of the right-end bearing 20d of the spool shaft 5, and a third gear 19c of a rotation transmission mechanism 15 is arranged abutted against a left side of an inner race of the bearing 20d. The reverse rotation preventing mechanism 17 is arranged abutted against a right side of an inner race of the left-end bearing 20a of the spool shaft 5. The first side cover 13a is arranged abutted against a right end of an outer race of the bearing 20d. A friction disk 27 of the drag mechanism 6 is arranged abutted against a left side of an inner race of the left bearing 20b supporting the spool 4, and the spool 4 abuts against the right side of the outer race of the left bearing 20b.

As shown in FIG. 2, the spool 4 has a line winding body portion 4a and first and second flange portions 4b and 4c that are integrally formed on opposite ends of the line winding by portion 4a. The spool 4 is rotatably supported on the spool shaft 5 with the bearings 20b and 20c.

As shown in FIG. 2, the handle 3 is fixed to a protruding end of a cylindrical handle shaft 31 that is arranged below the spool shaft 5 so as to be parallel to the spool shaft 5. The handle shaft 31 is rotatably supported in the reel unit 1 with two bearings 32 and 33 that are arranged below the cylindrical portion 14 so as to be spaced apart in an axial direction. As shown in FIG. 2, the handle 3 has a handle arm 40 that is fixed to the one end of the handle shaft 31 and a handle knob 41 that is rotatably supported on one end of the handle arm 40. The handle arm 40 is fastened to the one end of the handle shaft 31 with a screw member 42 such that it cannot rotate relative to the handle shaft 31. In order to make it easier to grip and apply force to, the external shape of the handle knob 41 is formed to be rounded and generally T-shaped.

The rotation transmission mechanism 15 has a gear changing mechanism contrived such that it can switch between a high speed gear ratio and a low speed gear ratio. As shown in FIG. 2, the rotation transmission mechanism 15 includes a first gear 19a for high-speed reeling-in and a second gear 19b for low-speed reeling-in that are rotatably supported on the handle shaft 31 of the handle 3, a third gear 19c and a fourth gear 19d that are non-rotatably attached to the spool shaft 5 and arranged to mesh with the first gear 19a and the second gear 19b, respectively, and an engaging piece 19e that is configured and arranged to selectively couple either the first gear 19a or the second gear 19b to the handle shaft 31 such that rotation can be transmitted from the handle 3 to the spool shaft 5.

As shown in FIG. 2, the drag mechanism 6 includes a brake disk 25 (a first braking member) attached to a left end of the spool 4, a pair of friction disks 26 and 27 (a second braking member) arranged on both sides (opposite sides) of the brake disk 25, and a coil spring 28 arranged to apply a spring load against the spool 4 in a direction of separating the brake disk 25 from the friction disk 27.

As shown in FIG. 2, the brake disk 25 is a circular disk-like member that is shaped like a washer and made of, for example, stainless steel. The brake disk 25 is attached to an end face of the first flange portion 4b (left side) of the spool 4 with a plurality of mounting pins that are arranged to be spaced apart from one another along a circumferential direction and configured such that the brake disk 25 can move freely toward and away from the spool 4 within a prescribed distance but cannot rotate with respect to the spool 4.

As shown in FIG. 2, the friction disk 26 is arranged facing a surface of the brake disk 25 that faces in a direction opposite the direction of (i.e., away from) the spool 4. The surface of the friction disk 26 that faces the brake disk 25 has a ring-shaped friction plate fastened thereto with small screws or another suitable fastening means. The friction plate is made of carbon graphite, fiber reinforced resin, or another wear resistant material. The friction disk 26 has a cylindrical boss arranged in a center portion thereof and a pin is passed through the boss in a radial direction of the spool shaft 5 and mounted into the spool shaft 5. In this way, the friction disk 26 is mounted non-rotatably to the spool shaft 5 such that it rotates together with the spool shaft 5. A ratchet wheel 50 of the reverse rotation preventing mechanism 17 is arranged abutting against a left end face of the boss of the friction disk 26. The ratchet wheel 50 is attached to an outer circumferential surface of the boss of the friction disk 26 and serrations or another suitable configuration is employed to prevent the ratchet wheel 50 from rotating relative to the boss. The ratchet wheel 50 abuts against the inner race of the bearing 20a, and the outer race of the bearing 20a abuts against the first side cover 13a. As a result, the friction disk 26 cannot move outward along an axial direction of the spool shaft 5, i.e., in a direction of separating from the brake disk 25, and rotation of the friction disk 26 in the line reel-out direction is prohibited by the ratchet wheel 50.

The reverse rotation preventing mechanism 17 is a pawl mechanism comprising the ratchet wheel 50, which has saw tooth-like ratchet teeth formed on an outer circumferential surface thereof, and a ratchet pawl 51 that is arranged in a radially outward direction from the outer circumferential surface of the ratchet wheel 50 such that one end thereof engages with the ratchet teeth. The ratchet pawl 51 is pivotally mounted on an inside surface of the first side cover 13a and spring loaded with a tensile spring in a direction of engaging with the ratchet teeth.

As shown in FIG. 2, the friction disk 27 is arranged facing a surface of the brake disk 25 that faces toward the spool 4 and the friction disk 27 is mounted to the spool shaft 5 such that it rotates together with the friction disk 26 and can move freely toward and away from the friction disk 26 along an axial direction of the spool shaft 5. A ring-shaped friction plate made of carbon graphite, fiber reinforced resin, or another wear resistant material is fastened with screws to a surface of the friction disk 27 that faces the brake disk 25. The friction disk 27 is non-rotatably mounted to the spool shaft 5 at a center portion thereof with a pin that is passed through the friction disk 27 in a radial direction of the spool shaft 5 and mounted into the spool shaft 5. A washer is arranged sandwiched between the right end face of the friction disk 27 and the inner race of the bearing 20b. As a result, the friction disk 27 is pushed by the spool 4 through the bearing 20b and also pushes the spool 4.

As shown in FIGS. 1 to 3, the drag adjusting mechanism 16 comprises chiefly the drag operating member 2 arranged on the reel unit 1 such that it can pivot freely about the spool shaft 5, a moving mechanism 46 contrived to move the spool 4 in an axial direction relative to the spool shaft 5 in response to a pivot movement of the drag operating member 2, a drag adjustment sound generating mechanism 47 contrived to generate a sound in response to a pivot movement of the drag operating member 2, and a drag restricting member 70 contrived to restrict a pivot movement of the drag operating member 2 by contacting the drag operating member 2. The moving mechanism 46 has a pushing mechanism 48 contrived to push and move the spool 4 and the friction disk 27 leftward when the drag operating member 2 is pivoted clockwise from the perspective of FIG. 3 and a return spring 49 arranged to spring load the friction disk 27 such that the spool 4 and the friction disk 27 move rightward when the drag operating member 2 is pivoted counterclockwise from the perspective of FIG. 3. As shown in FIG. 2, the drag adjustment sound generating mechanism 47 comprises a plurality of through holes 82 arranged in the plate member 80 so as to face the drag operating member 2 and to extend from a free position to a maximum position along a pivot direction of the drag operating member 2 with spaces in-between, a sound generating pin 83 attached to the drag operating member 2 such that it can move reciprocally toward and away from the through holes 82, and a coil spring 84 arranged to spring load the sound generating pin 83 toward the through holes 82. The through holes 82 comprise a portion ranging from the free position to a strike position and a portion having an open interval in the pivot direction between the maximum position and a position preceding the maximum position.

As shown in FIGS. 1 and 3, the drag operating member 2 is a lever member pivotally attached to an outside portion of the reel unit 1 such that it can pivot freely about the spool shaft 5 of the spool 4 between a free position (position A in FIG. 3) corresponding to a drag free state in which the spool 4 can rotate freely and a maximum position (position B in FIG. 3) corresponding to a maximum drag state of the drag mechanism 6. As shown in FIGS. 1 and 3, the drag operating member 2 has an operating section 2a arranged above for an angler to operate manually and a plate section 2b arranged below.

As shown in FIGS. 1 and 3, the drag restricting member 70 is detachably mounted to one of the through holes 82 provided in an outer portion of the plate member 80 within a pivot range between a minimum position and a maximum position of the drag operating member 2. The drag restricting member 70 serves to restrict a pivot movement of the drag operating member 2 by contacting the drag operating member 2. As shown in the enlarged views of FIGS. 5 to 8, the drag restricting member 70 has a cut-out portion 71a that can be removably clamped onto an outside edge portion of the plate member 80 so as to face toward a radially inward portion of the plate member 80. The drag restricting member 70 has a cylindrical main body member 71 having the cut-out portion 71a formed in a side portion thereof and a through hole 71b passing through a middle portion of both ends thereof, a force applying member 72 installed in the through hole 71b of the main body member 71 in a compressed state, and a pin member 73 configured to be installed in the through hole 71b of the main body member 71 and loaded by the force applying member 72 such that one end portion is mounted in a through hole 82 of the plate member 80.

Figure 5:
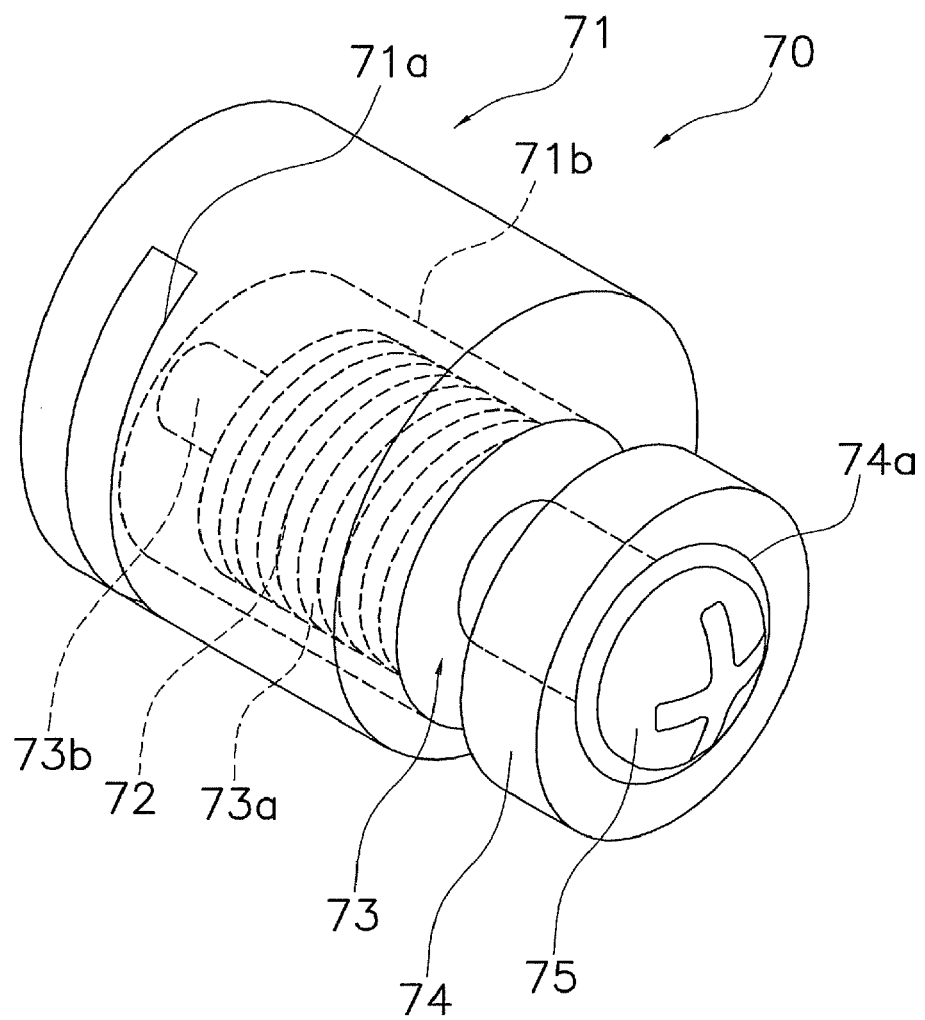
FIG. 5 is an enlarged perspective view of a drag restricting member.
Figure 6:
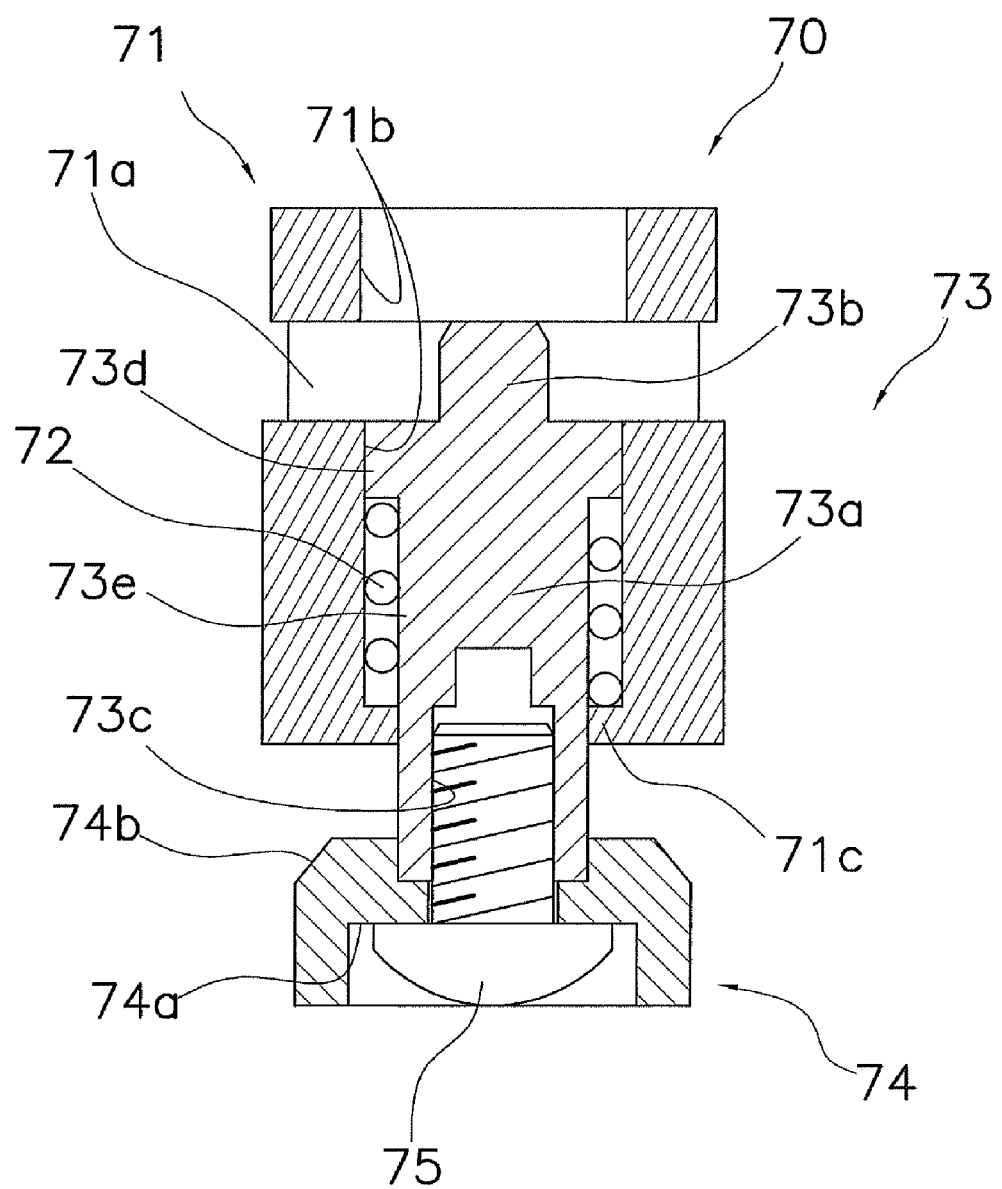
FIG. 6 is a frontal cross sectional view of the drag restricting member.
Figure 7:
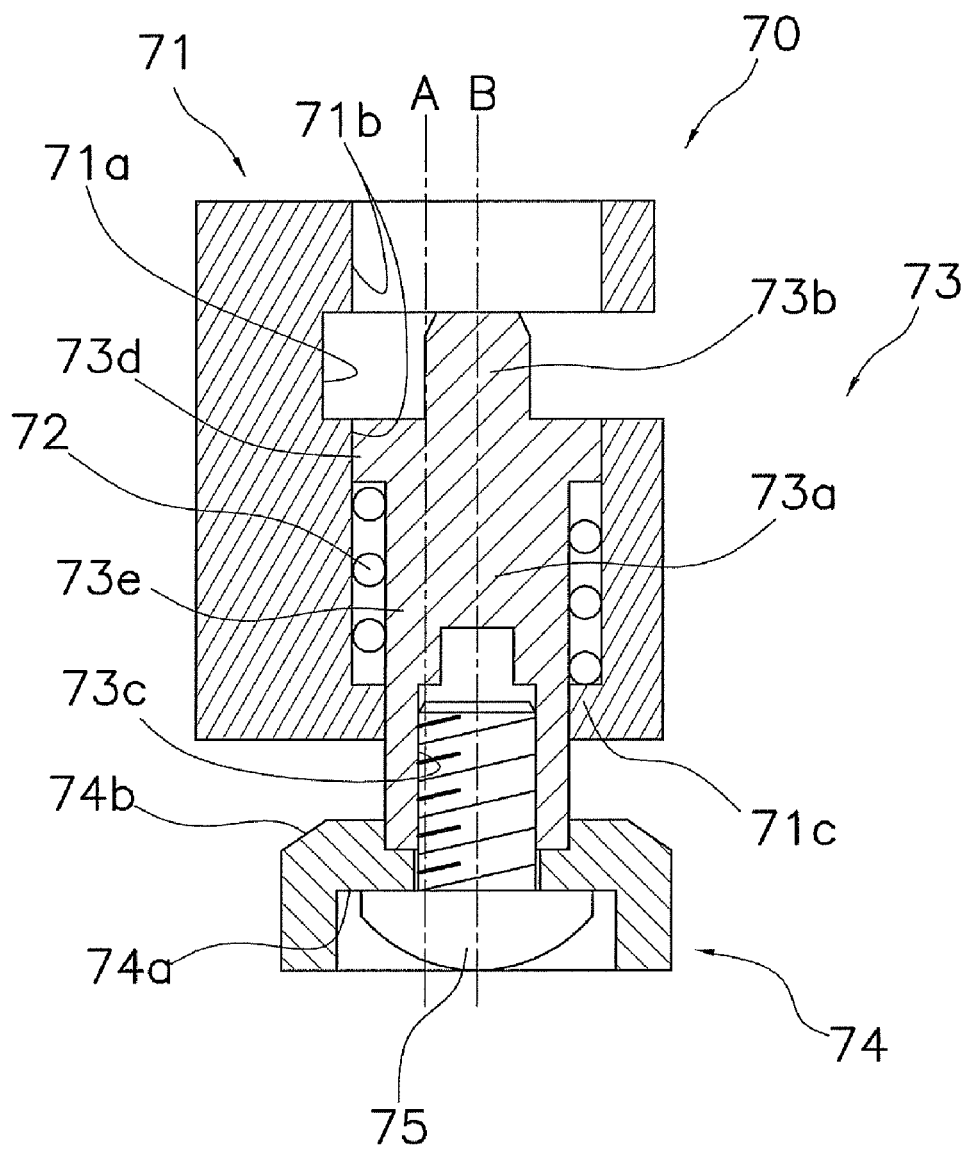
FIG. 7 is a side cross sectional view of the drag restricting member.

As shown in FIGS. 5 to 8, the main body member 71 is a cylindrically shaped member having the cut-out portion 71a formed in a side portion thereof. As shown in FIGS. 5 to 8, the main body member 71 has a through hole 71b formed so as to pass through a middle portion of both ends thereof, and a portion of the through hole 71b is exposed to the outside by the cut-out portion 71a. As shown in FIGS. 5 to 8, the cut-out portion 71a is a generally circular arc-shaped slit cut into the main body member 71 nearer to one end thereof and has a width slightly larger than a thickness of the plate member 80 such that it can pinch the plate member 80. As shown in FIGS. 6 to 10, the through hole 71b has a circular cross section and a center-line B that is non-concentric with a center-line A of the cylindrical main body member 71. As shown in FIGS. 6 and 7, a bottom portion 71c constituting a flange is formed on another end portion of the main body member 71. The bottom portion 71c serves to reduce the internal diameter of the through hole 71b and provide a place for another end of the force applying member 72 to abut against.

Figure 8:
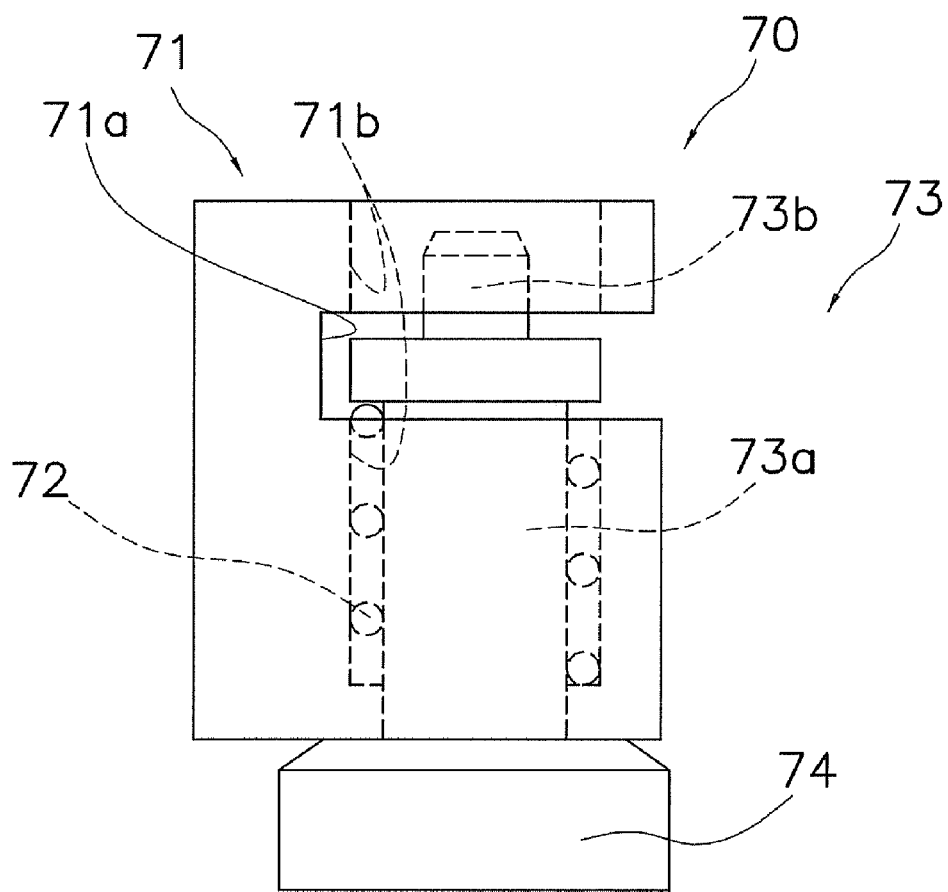
FIG. 8 is a side view of the drag restricting member.
Figure 9:
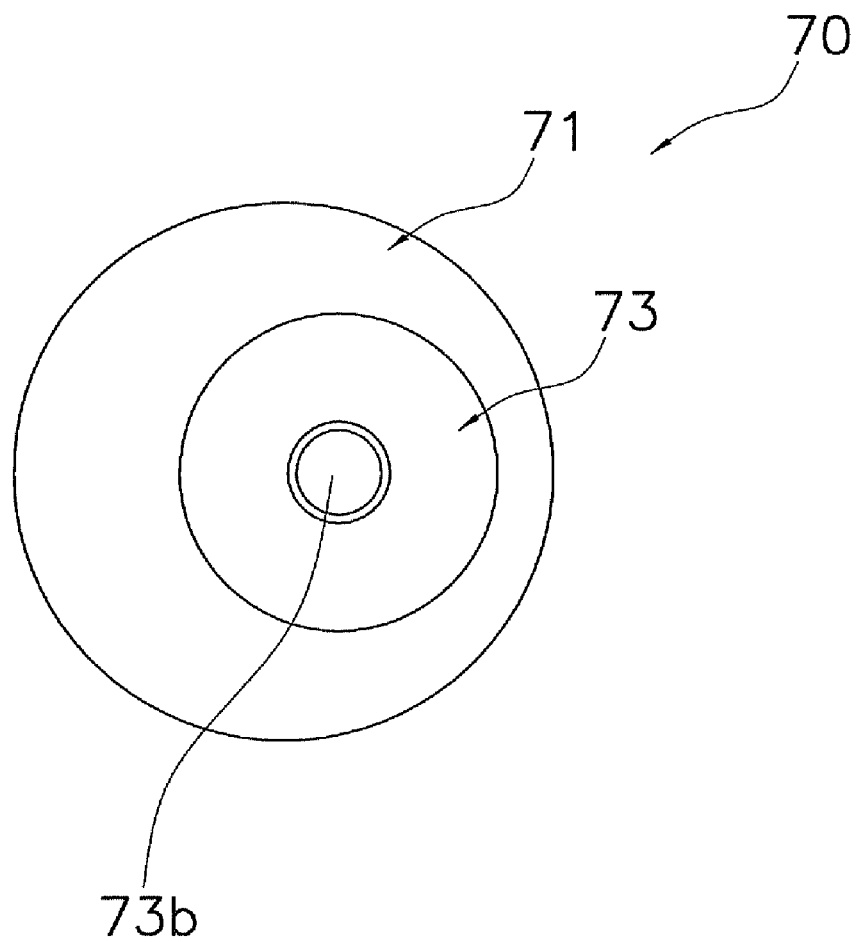
FIG. 9 is bottom plan view of the drag restricting member.
Figure 10:
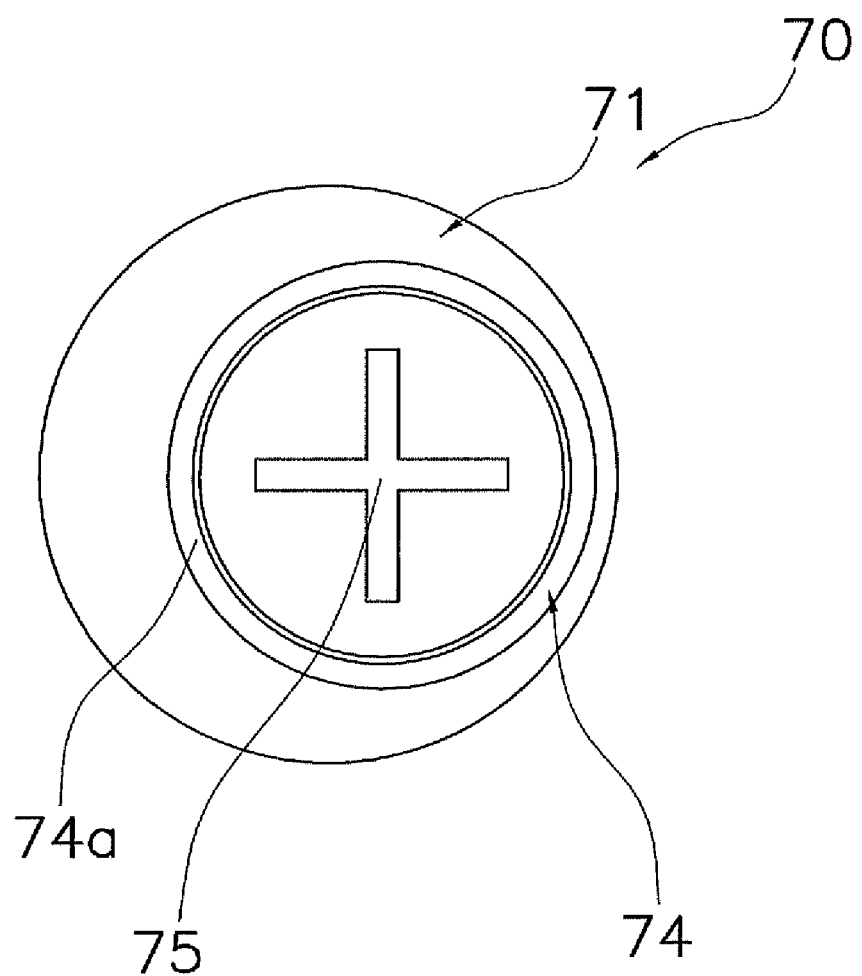
FIG. 10 is top plan view of the drag restricting member.

As shown in FIGS. 5 to 8, the force applying member 72 is a coil spring arranged in the through hole 71b of the main body member 71 in a compressed state. The another end of the force applying member 72 contacts the bottom portion 71c of the main body member and the one end of the force applying member 72 contacts a larger diameter portion of the pin member 73 (described later) such that the force applying member 72 is in a compressed state. In this way, the pin member 73 is spring loaded toward the through holes 82 of the plate member 80. Thus, as shown in FIGS. 5 to 7, when the cut-out portion 71a is installed on the plate member 80 (i.e., when the drag restricting member 70 is attached), the pin member 73 is pushed rearward (outward) by the plate member 80 in opposition to the spring force of the force applying member 72 and a detachment preventing portion 73b of the pin member 73 (described later) is mounted into a through hole 82 of the plate member 80. Conversely, as shown in FIG. 8, when the cut-out portion 71a is separated from the plate member 80 (i.e., when the drag restricting member 70 is removed), the pin member is pushed forward (inward) by the spring force of the force applying member 72 until the knob portion 74 of the pin member 73 (described later) contacts an outward end surface of the main body member 71. The contact of the knob portion 74 prevents the main body member 71, the force applying member 72, and the pin member 73 from coming apart.

As shown in FIGS. 5 to 8, the pin member 73 is inserted into the through hole 71b of the main body member 71 and loaded toward a through hole 82 of the plate member 80 by the force applying member 72 so as to be mounted in the through hole 82 of the plate member 80. As shown in FIGS. 5 to 8, the pin member 73 has a shaft portion 73a, a detachment preventing portion 73b, and a knob portion 74.

As shown in FIGS. 5 to 8, the shaft portion 73a is a shaft member that is inserted into the through hole 71b of the main body member 71 and has a larger diameter portion 73d positioned toward one end thereof and a smaller diameter portion 73e positioned on the another side of the larger diameter portion 73d. An external diameter of the larger diameter portion 73d is slightly smaller than an internal diameter of the through hole 71b of the main body member 71. The force applying member 72 is installed on the outer circumference of the smaller diameter portion 73e inside the through hole 71b.

As shown in FIGS. 5 to 9, the detachment preventing portion 73b is provided integrally on one end portion of the shaft portion 73a and is configured to fit into a through hole 82. The one end of the detachment preventing portion 73b is rounded in a semispherical shape such that the detachment preventing portion 73b of the pin member 73 will retract in the another direction more readily when the cut-out portion 71a is installed onto the plate member 80.

As shown in FIGS. 5 to 8 and 10, the knob portion 74 serves as a portion for an angler to grasp and pull outward (proximally) and is provided on another end portion of the shaft portion 73*a* as a separate entity from the shaft portion 73*a* and the detachment preventing portion 73*b*. The knob portion 74 has a larger diameter than the shaft portion 73*a* and is attached such that it can contact the another end of the main body member 71. The knob portion 74 is fastened to the another end of the shaft portion 73*a* of the pin member 73 with a bolt 75 installed into a bolt hole 73*c* formed in the shaft portion 73*a*. A bolt housing counterbore 74*a* for housing a head portion of the bolt 75 is formed in another end portion of the knob portion 74. A tapered portion 74*b* configured such that an outside diameter thereof decreases toward the shaft portion 73*a* is provided on one end of the knob portion 74 such that an angler can grasp the knob portion 74 more easily.

In order to assemble the drag restricting member 70, first the detachment preventing portion 73*b* is fixed to one end portion of the shaft portion 73*a* and the shaft portion 73*a* is inserted into the through hole 71*b* of the main body member 71 along with the force applying member 72. The knob portion 74 (which has a larger diameter than the shaft portion 73*a*) is then fastened to another end portion of the shaft portion 73*a* protruding from the one end of the main body member 71. The force applying member 72 is thus installed around the outside circumference of the shaft portion 73*a* in a compressed state. Meanwhile, the knob portion 74 is fastened to the shaft portion 73*a* with the bolt 75 such that contacts another end face of the main body member 71, thus preventing the pin member 73 from detaching from the main body member 71.

In this dual-bearing reel, a drag restricting member 70 is detachably arranged on an outside of the plate member 80 between a minimum position and a maximum position of the drag operating member 2 within a pivot range of the drag operating member 2 and contrived to restrict a pivot movement of the drag operating member 2 by contacting the drag operating member 2. Since the drag restricting member 70 can be detachably mounted to any of the through holes 82 of the plate member 80 provided within the pivot range of the drag operating member 2, a minimum pivot range or a maximum pivot range of the drag operating member 2 can be set in a precise manner (i.e., in fine increments). For example, by attaching the drag restricting member 70 in a position establishing a minimum pivot range of the drag operating member 2, the problem of inadvertently returning the drag operating member too far toward a lower drag state and causing the drag force to weaken can be eliminated, thereby preventing the occurrence of fishing line backlash. Conversely, by attaching the drag restricting member 70 in a position establishing a maximum pivot range of the drag operating member 2, the problem of inadvertently moving the drag operating member 2 too far toward a higher drag state and causing the drag force to become too large can be eliminated, thereby preventing breakage of the fishing line. Thus, since the drag restricting member 70 can be detachably arranged in any position within the pivot range of the drag operating member 2, an angler can easily change the pivot range of the drag operating member 2 as desired.

EFFECTS OF THE INVENTION

With the present invention, a drag restricting member of a drag adjusting device for a dual-bearing reel drag is detachably arranged on an outside of the reel unit within a pivot range of a drag operating member between a minimum position and a maximum position of the drag operating member and contrived to restrict a pivot movement of the drag operating member by contacting the drag operating member. As a result, an angler can easily change the pivot range of the drag operating member as desired.

Other Example Embodiments (a) Although in the previously described embodiment, the present invention is employed in a medium sized reel for trolling, the present invention is not limited to such an application and can employed in any dual-bearing reel having a lever-type drag adjusting mechanism.

Figure 11:
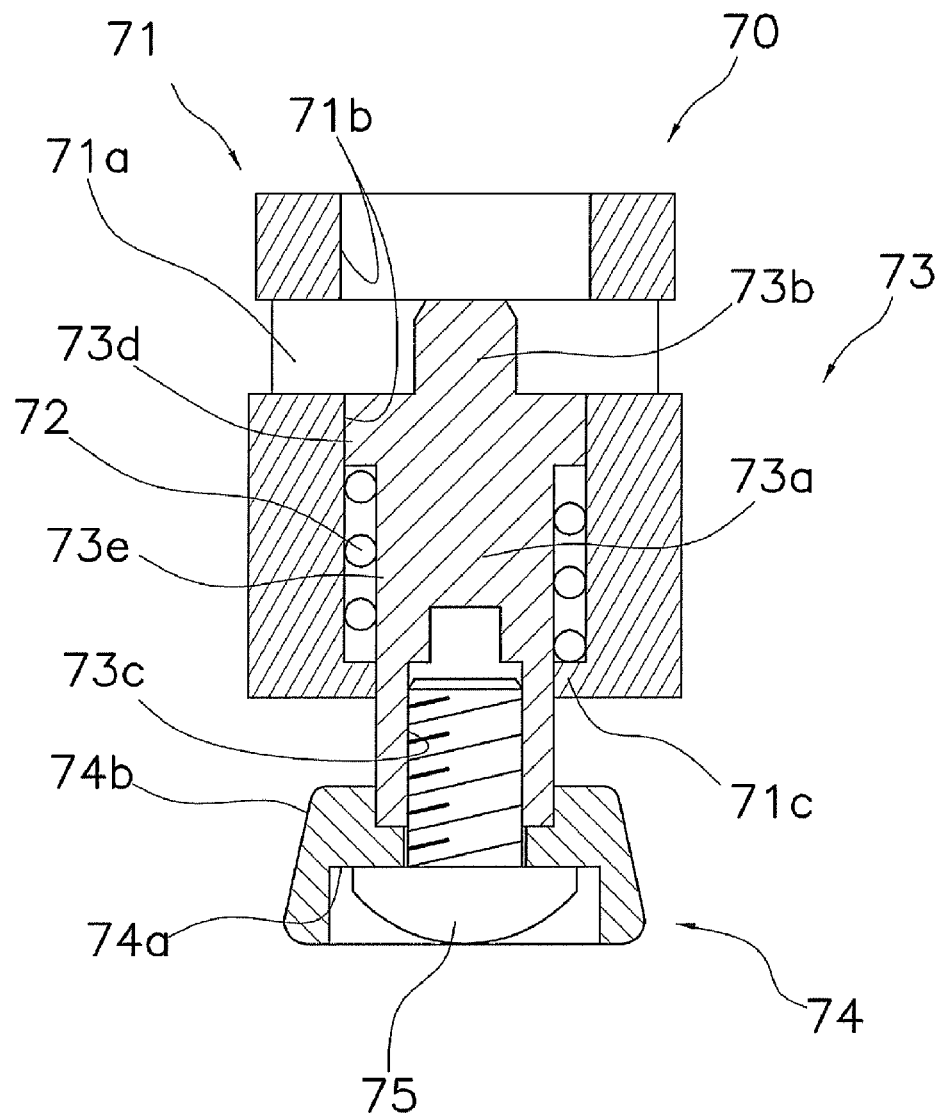
FIG. 11 is a view of another embodiment and is equivalent to FIG. 6.

(b) In the previously described embodiment, the tapered portion 74*b* configured such that an outside diameter thereof decreases toward the shaft portion 73*a* only occupies one end portion of the knob portion 74. However, it is also acceptable to configure the knob portion 74 such that the tapered portion 74*b* spans the entire axial length of the knob portion 74, as shown in FIG. 11.

Figure 12:
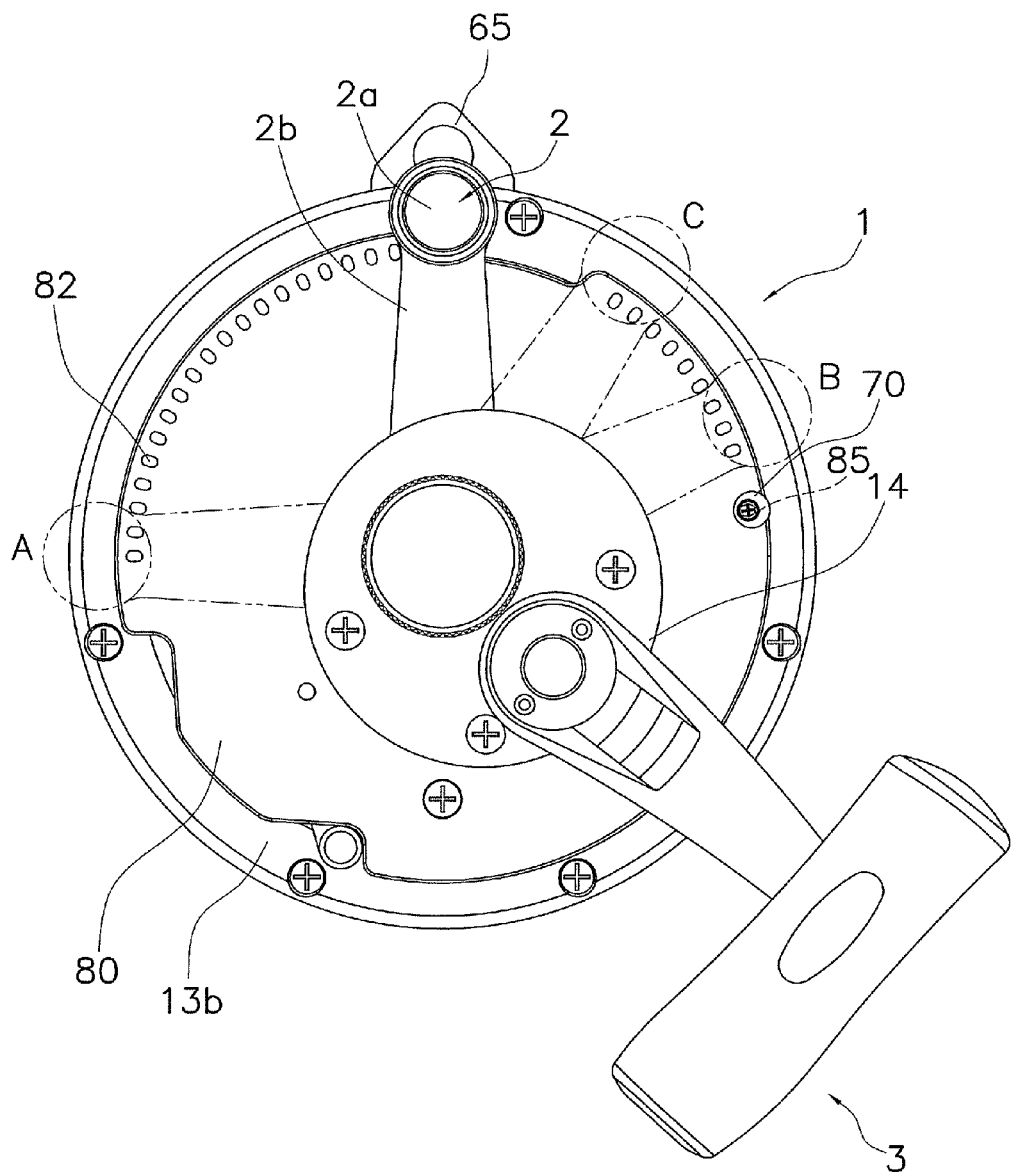
FIG. 12 is a view of another embodiment and is equivalent to FIG. 3.

(c) In the previous embodiment, the drag restricting member 70 is removed from the reel when it is not attached to a through hole 82 of the plate member 80. However, as shown in FIG. 12, it is also acceptable to provide a storage recess 85 comprising a through hole in a position outside the pivot range of the drag operating member 2 (in FIG. 12, a position rightward to the outside of the maximum pivot range of the drag operating member 2) and attach the drag restricting member 70 to the storage recess 85 when the drag restricting member 70 is not being used. In this way, loss of the drag restricting member 70 can be prevented.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applied to words having similar meanings such as the terms, "including," "having," "with" and their derivatives. Also, the term "part," "section," "portion," "member," or "element" when used in the singular can have the dual meaning of a single part or a plurality of parts.

As used herein, the following directional terms "forward", "rearward", "above", "below", "downward", "upward", "vertical", "horizontal", "inner", "outer", "longitudinal" and "transverse" as well as any other similar directional terms refer to those directions of a device equipped with the present invention. Accordingly, these terms, as utilized to describe aspects of the present invention, should be interpreted relative to a device equipped with the present invention.

The term "configured" as used herein to describe a component, section or part of a device implies the exist of other unclaimed or unmentioned components, sections or parts of the device to carry out a desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A drag adjusting device for a dual-bearing reel for adjusting a drag force of a drag mechanism and constructed to brake a spool rotatably mounted to a reel unit of the dual-bearing reel, the drag adjusting device comprising:

a drag operating member pivotally attached to an outer side of the reel unit so as to pivot about a spool shaft of the spool between a minimum position corresponding to a minimum drag state of the drag mechanism and a maximum position corresponding to a maximum drag state of the drag mechanism; and a drag restricting member detachably coupled to the outer side of the reel unit and disposed within the pivot range between the minimum position and the maximum position, the drag restricting member being adapted to contact the drag operating member so as to restrict pivotal movement of the drag operating member, the drag restricting member being selectably coupled to any of a plurality of mounting recesses of an outer side surface of the reel unit.

2. The drag adjusting device for a dual-bearing reel as recited in claim 1, wherein the reel unit including a side cover, a substantially circular shaped plate member attached to the side cover along the axial direction of the spool shaft, and a plurality of mounting recesses arranged along the radial direction of the plate member between the minimum position and the maximum position.

3. The drag adjusting device for a dual-bearing reel as recited in claim 2, wherein each of the plurality of mounting recesses is a through-hole.

4. The drag adjusting device for a dual-bearing reel as recited in claim 2, further comprising a sound generating member mounted to either the reel unit or the drag restricting member, and being reciprocally movable toward and away from the plurality of mounting recesses to generate a sound by repeatedly contacting the plurality of mounting recesses.

5. The drag adjusting device for a dual-bearing reel as recited in claim 4, wherein the drag restricting member has a substantially cylindrical portion, formed on a side of the drag restricting member is an aperture so as to removably mount the drag restricting member onto an outer edge portion of the substantially circular shaped plate member.

6. The drag adjusting device for a dual-bearing reel as recited in claim 5, wherein a force applying member is disposed inside the cylindrical portion, and a pin member including a shaft member is inserted through the force applying member and a channel of the cylindrical portion, and urged into one of the plurality of mounting recesses by the force applying member.

7. The drag adjusting device for a dual-bearing reel as recited in claim 6, wherein the pin member further including a detachment preventing portion provided on one end portion of the shaft member and adapted to be inserted into one of the plurality of mounting recesses, and a knob portion removably coupled to an opposing end portion of the shaft member, the knob portion being in contact with the cylindrical portion of the drag restricting member and having a diameter larger than the shaft member.

8. The drag adjusting device for a dual-bearing reel as recited in claim 7, wherein the cylindrical portion of the drag restricting member and the channel of the cylindrical portion are non-concentrically disposed along the longitudinal direction.

9. The drag adjusting device for a dual-bearing reel as recited in claim 8, further comprising a first braking member attached to an outer side of the spool; and a second braking member configured to contact the first braking member, the second braking member being connected to the spool shaft to prevent movement in the axial direction and rotational movement in a line reel-out direction of the spool, a variable braking force is applied to the spool when the drag operating member pivots between the minimum position and the maximum position.

* * * * *